Figure 1:
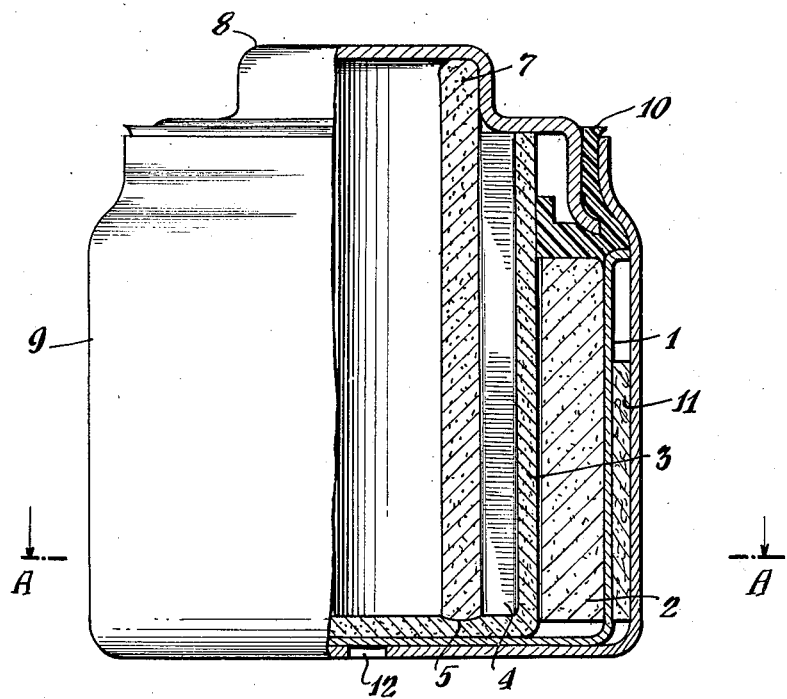

Feb. 4, 1958  N. PARKINSON  2,822,416

PRIMARY CELL

Filed Sept. 16, 1955

INVENTOR
Norman Parkinson
BY
ATTORNEY

United States Patent Office 2,822,416
Patented Feb. 4, 1958

2,822,416

PRIMARY CELL

Norman Parkinson, Brentwood, England, assignor to P. R. Mallory & Co., Inc., Indianapolis, Ind., a corporation of Delaware Application September 16, 1955, Serial No. 534,653

Claims priority, application Great Britain September 27, 1954

7 Claims. (Cl. 136—107)

This invention relates to alkaline dry cells wherein the electrolyte is an aqueous solution contained in porous material sandwiched between the anode and the cathode. A cell of this kind is described in U. S. Patent No. 2,422,045 to Samuel Ruben.

In such cells it is known to employ porous paper as the porous material and also to provide a mciroporous barrier layer of dialysis material, such as parchment paper, to limit migration of solid particles between the cathode and the anode.

Whilst satisfactory cells are obtained by manufacture and use of materials according to the specification of the above-mentioned patent, it has been found that the porous paper is degraded during shelf life, causing increase of the internal resistance and reduction of capacity of the cell.

The invention has particular but not exclusive application to such cells comprising a central anode rod of zinc, preferably a consolidated rod of zinc powder, a coherent, conductive cathode depolarizer in the form of a cylinder containing an electrolytically reducible oxygen-yielding compound, preferably a mixture of mercuric oxide and graphite, and wherein the immobilized alkaline electrolyte, preferably containing a substantial amount of alkali metal zincate, surrounds the rod in contact therewith and the interior of the cylinder, for example, as described with reference to Figures 11 and 12 of the above patent. The nature of the invention will be more specifically described hereafter in association with such a cell.

The primary object of the present invention is to provide an improved alkaline dry battery in which the foregoing defects are avoided whereby to increase the shelf life and incidentally to simplify manufacture. According to the present invention, a combined porous spacer and barrier is employed of micro-porous polyvinyl chloride, which is provided with ribs or projections, which fit against the adjacent surface of the anode material whereby recesses are afforded into which the anode material may expand on discharge of the battery.

In the form of battery in which the anode is in the form of a rod or a pile of pellets of consolidated zinc powder, which may be amalgamated, the spaced and barrier will be a tube of polyvinyl chloride having interior longitudinally extending, laterally spaced ribs and may include a closure at the lower end of the same material so that when the rod or pellets have been assembled therewith, the rod or the lower pellet will bear against the upper surface of the closure. The closure prevents migration of particles between the lower anode and the cathode.

Figure 2:
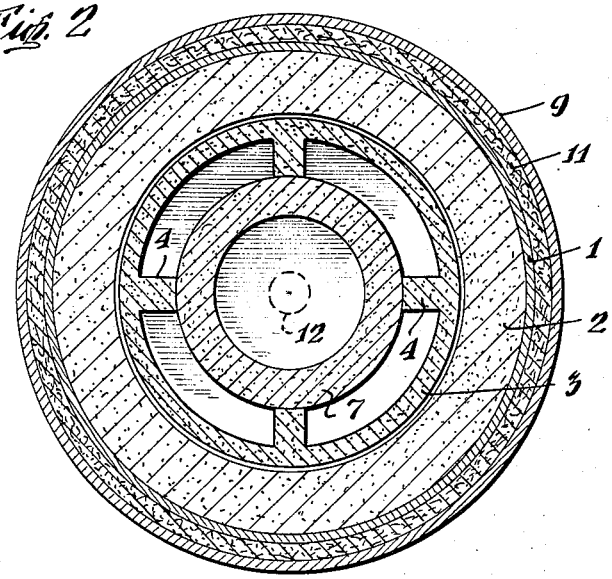

In the drawing:

Figure 1 is a vertical sectional view, having parts in elevation, of a dry cell embodying the present invention; and Figure 2 is a horizontal sectional view taken on line A—A of Figure 1.

To obtain a better understanding of the invention, reference may be had to the accompanying drawing in which the principles of the invention are applied to a known form of cylindrical type cell, the general structural features of which are disclosed and claimed in U. S. Patent No. 2,636,062 to Robert Colton. An inner container 1 of metal, preferably steel, has fitted in close contact with the interior surface thereof a consolidated cylindrical body 2 of cathode depolarizer, for example, a mixture of mercuric oxide and micronized graphite. Within the cylinder is fitted a thimble or cup 3 of porous polyvinyl chloride, for example, that known under the trade name "Porvic," the cylindrical wall of which has three or more, for example, four, inwardly projecting parallel ribs 4. The anode 7 is a cylindrical body, preferably a porous consolidated body of amalgamated zinc powder, and the ribs facilitate in manufacture of a cell centralization of the anode in the container and relatively to the top 8 of the container, which is of conducting material, preferably steel, and has a recess which receives and fits the top and adjacent peripheral portion of the anode.

An outer container 9 and the top have between their marginal portions an insulating grommet 10 made of a suitable elastomer, such as neoprene, which forms the seal. During sealing, the grommet is compressed between the margin of the top and the upper margin of the outer container so that it exerts downward pressure on the top of the anode whereby depression of the bottom 5 of the thimble is produced and the anode will be maintained firmly seated thereon. The space between the inner and outer containers has fitted therein a body of absorbent material 11, for example, paper, to absorb any electrolyte which might escape into said space, and a vent aperture 12 is provided in the bottom of the cup to permit escape of gas generated in the cell.

The cylindrical portion of the thimble or cup may be made from ribbed sheet polyvinyl chloride by first bending a strip thereof into circular form and securing the edges together by a suitable adhesive and then securing a bottom closure disc of the same material to the lower edge of the cylinder by adhesive. The adhesive employed may be a Perspex cement. Alternatively, the cylindrical portion of the cup may be made by extrusion and then cut into suitable lengths for the cell being manufactured, and then securing the bottom closure onto one end of the cylinder by adhesive.

It is, of course, understood that the thimble before assembly with the other parts of the cell may be impregnated with alkaline electrolyte, which may be an aqueous solution of potassium hydroxide, containing a substantial amount of potassium zincate, for example, as specified in the aforementioned Ruben patent, and, if necessary, a further measured quantity of the solution may be added to the cell before the top is assembled with the outer container.

The porous polyvinyl chloride employed is preferably that known under the trade name "Porvic" in which the pores constitute about 80 percent in a given volume and it has been found that with such material migration of solid particles of sizes of from 5 to 10 microns is prevented. Thus, the provision of an additional element to inhibit such migration is unnecessary, as the material employed serves that purpose and also to immobilize the electrolyte.

As an alternative to polyvinyl chloride, porous rubber from which free sulphur has been removed may also be employed.

What is claimed is:

1. An alkaline dry cell comprising, in combination, an anode of compressed amalgamated zinc powder, a coherent conductive cathode containing an electrolytically reducible oxygen-yielding compound, a combined spacer and barrier member in the form of a cylindrical porous cup coaxial with the anode interposed between said anode and cathode and constituting a continuous layer therebetween, and an alkaline electrolyte impregnating said cup, said cup having projections extending toward the adjacent surface of the anode and defining therewith spaces in the form of sectors of a cylinder coaxial with the anode into which the anode material may expand on discharge of the cell.

2. An alkaline dry cell comprising, in combination, a cylindrical cup formed of microporous alkali-resistant inert material having internally extending ribs, an anode of compressed amalgamated zinc powder held in coaxial position with respect to said cup by said ribs, a coherent conductive cathode depolarizer around the outer surface of said cup, and an alkaline electrolyte absorbed in said cup, the adjacent surfaces of said anode and of said cup defining a plurality of spaces in the form of sectors of a cylinder coaxial with the anode into which the anode material may expand on discharge of the cell, said cup constituting a continuous barrier layer to limit migration of solid particles between the cathode and the anode.

3. An alkaline dry cell comprising, in combination, a cylindrical cup formed of microporous alkali-resistant inert material having internally extending ribs, a cylindrical anode of compressed amalgamated zinc powder held in coaxial position within said cup by said ribs, a coherent conductive cathode depolarizer in the form of a hollow cylinder around the outer surface of said cup, and an alkaline electrolyte absorbed in said cup, the adjacent surfaces of said anode and of said cup defining a plurality of spaces in the form of sectors of a cylinder coaxial with the anode into which the anode material may expand on discharge of the cell, said cup constituting a continuous barrier layer to limit migration of solid particles between the cathode and the anode.

4. An alkaline dry cell comprising, in combination, a metal container, a hollow cylindrical cathode depolarizer body containing an electrolytically reducible oxygen-yielding compound within and in contact with said container, a cylindrical cup of microporous alkali-resistant inert material having internally extending ribs within the inner space of said cathode depolarizer body, a cylindrical anode of compressed amalgamated zinc powder centrally and coaxially held within said cup by said ribs and defining therewith a plurality of spaces in the form of sectors of a cylinder coaxial with the anode into which the anode material may expand on discharge of the cell, an alkaline electrolyte absorbed in said cup and in contact with said cathode and anode, said cup constituting a continuous barrier layer to limit migration of solid particles between the cathode and the anode, a metal top in contact with said anode, and an insulating grommet compressed between cooperating marginal portions of said container and said top and defining therewith a sealed enclosure for said cell.

5. An alkaline dry cell comprising, in combination, an inner metal container, a hollow cylindrical cathode depolarizer body containing an electrolytically reducible oxygen-yielding compound within and in contact with said container, a cylindrical cup of microporous alkali-resistant inert material within the inner space of said cathode depolarizer body and having internally extending ribs, a hollow cylindrical anode of compressed amalgamated zinc powder centrally and coaxially held within said cup by said ribs and defining therewith a plurality of spaces in the form of sectors of a cylinder coaxial with the anode into which the anode material may expand on discharge of the cell, an alkaline electrolyte in contact with said cathode and anode and impregnating said cup, said cup constituting a continuous barrier layer to limit migration of solid particles between the cathode and the anode, a dished metal top in contact with an end of said anode, an insulating sealing grommet having a first portion compressed between cooperating marginal portions of said inner container and said top and having a second portion extending externally along said top, and means including an outer container having its mouth portions constricted over said second portion of the grommet for maintaining said inner container and said top in sealed insulative relation with respect to each other.

6. An alkaline dry cell comprising, in combination, a combination spacer and barrier member of microporous polyvinyl chloride in the shape of a cylindrical cup having internally extending ribs, a cylindrical anode of compressed amalgamated zinc powder coaxially held in said cup by said ribs, a coherent conductive cathode depolarizer in the form of a hollow cylinder around the outer surface of said cup, and an alkaline electrolyte in contact with said anode and cathode and impregnating said cup, the adjacent surfaces of said anode and of said cup defining a plurality of spaces in the form of sectors of a cylinder coaxial with the anode into which the anode material may expand on discharge of the cell, said cup constituting a continuous barrier layer to limit migration of solid particles between the cathode and the anode.

7. An alkaline dry cell comprising, in combination, a metal container, a hollow cylindrical cathode depolarizer body containing an electrolytically reducible oxygen-yielding compound within and in contact with said container, a cylindrical cup of microporous polyvinyl chloride having internally extending ribs within the inner space of said cathode depolarizer body, a cylindrical anode of compressed amalgamated zinc powder centrally and coaxially held within said cup by said ribs and defining therewith a plurality of spaces in the form of sectors of a cylinder coaxial with the anode into which the anode material may expand on discharge of the cell, and alkaline electrolyte impregnating said cup and in contact with said cathode and anode, said cup constituting a continuous barrier layer to limit migration of solid particles between the cathode and the anode, a metal top in contact with said anode, and an insulating grommet compressed between cooperating marginal portions of said container and said top and constituting therewith a sealed enclosure for said cell, the adjacent surfaces of said anode and of said cup defining an interspace into which the anode material may expand on discharge of the cell.

References Cited in the file of this patent
UNITED STATES PATENTS

| 1,395,281 | Koretzky | Nov. 1, 1921 |
| 2,712,565 | Williams | July 5, 1955 |
| 2,729,694 | Ellis | Jan. 3, 1956 |